United States Patent [19]

McDaniel et al.

[11] Patent Number: 4,753,721

[45] Date of Patent: Jun. 28, 1988

[54] PROCESS FOR RESID HYDROTREATING EMPLOYING FEED DISTRIBUTOR

[75] Inventors: Norman K. McDaniel, Dickinson; Paul E. Stelly, Lamarque; Robert E. Boening, Galveston; William E. McWhirter, Jr., Dickinson; Duncan E. Atkinson, Texas City, all of Tex.; Richard D. Petersen, Valparaiso, Ind.

[73] Assignee: Amoco Corporation, Chicago, Ill.

[21] Appl. No.: 922,866

[22] Filed: Oct. 24, 1986

[51] Int. Cl.⁴ ............................................ C10G 23/06
[52] U.S. Cl. ..................................... 208/143; 208/146; 208/113; 208/157
[58] Field of Search ............... 208/143, 146, 157, 113, 208/166

[56] References Cited

U.S. PATENT DOCUMENTS

| | | | |
|---|---|---|---|
| 2,987,465 | 6/1961 | Johanson | 208/146 X |
| 3,523,888 | 8/1970 | Stewart et al. | 208/157 |
| 3,556,989 | 1/1971 | Weber et al. | 208/157 X |
| 3,560,167 | 2/1971 | Bruckner et al. | 208/146 X |
| 3,761,393 | 9/1973 | Wolk et al. | 208/146 X |
| 3,788,973 | 1/1974 | Wolk et al. | 208/157 X |
| 3,817,856 | 6/1974 | Aaron et al. | 208/157 X |

*Primary Examiner*—Helen M. S. Sneed
*Assistant Examiner*—Glenn Caldarola
*Attorney, Agent, or Firm*—Thomas W. Tolpin; William H. Magidson; Ralph C. Medhurst

[57] ABSTRACT

A special feed distributor is provided to radially, annularly, and uniformly feed and distribute oil and gas in a hydroprocessing unit, such as an ebullated bed reactor. In the preferred form, the feed distributor comprises an octagonal manifold with tangential outlet openings, a circumferential set of downward outlets, and a slotted skirt with radial discharge openings.

5 Claims, 6 Drawing Sheets

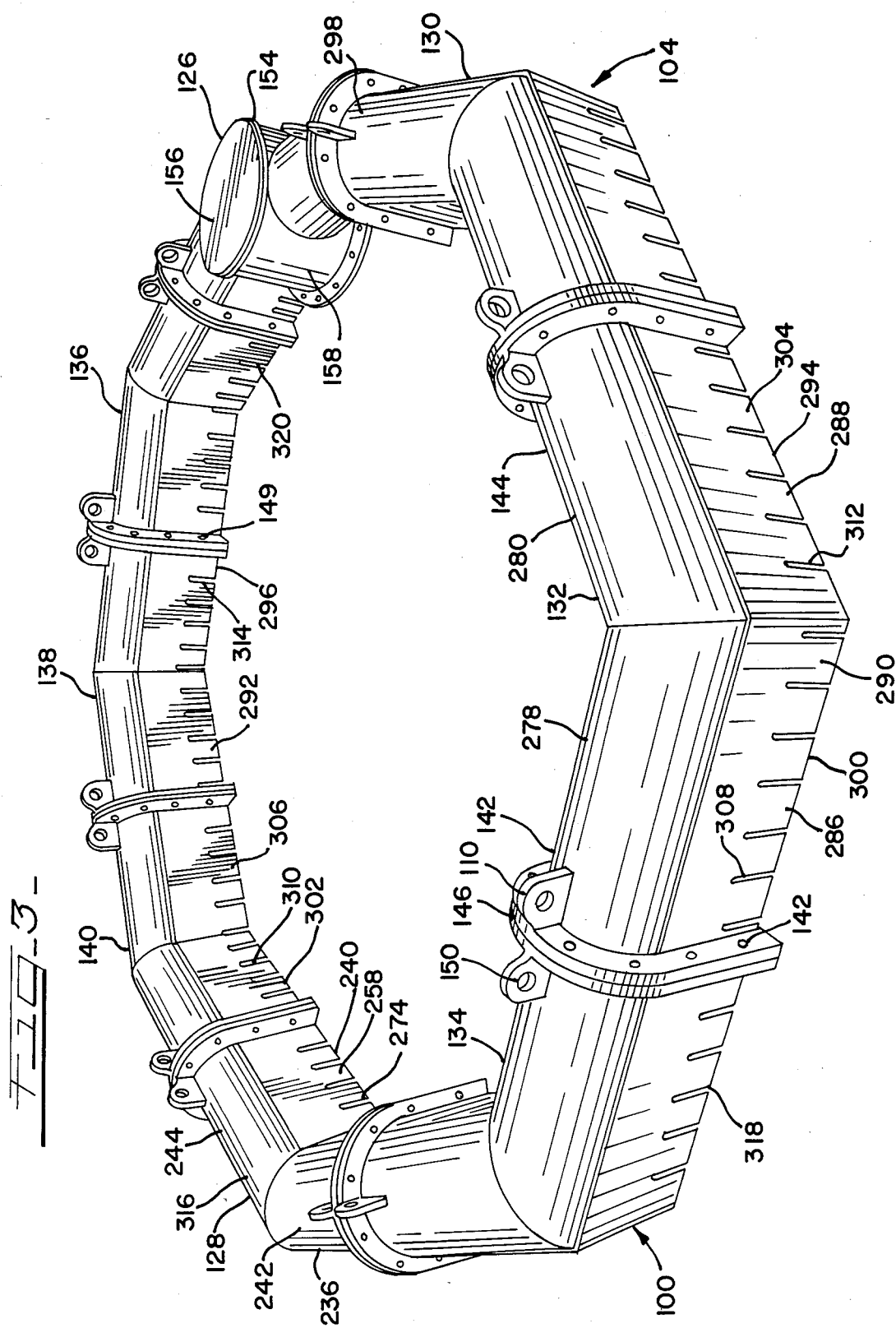

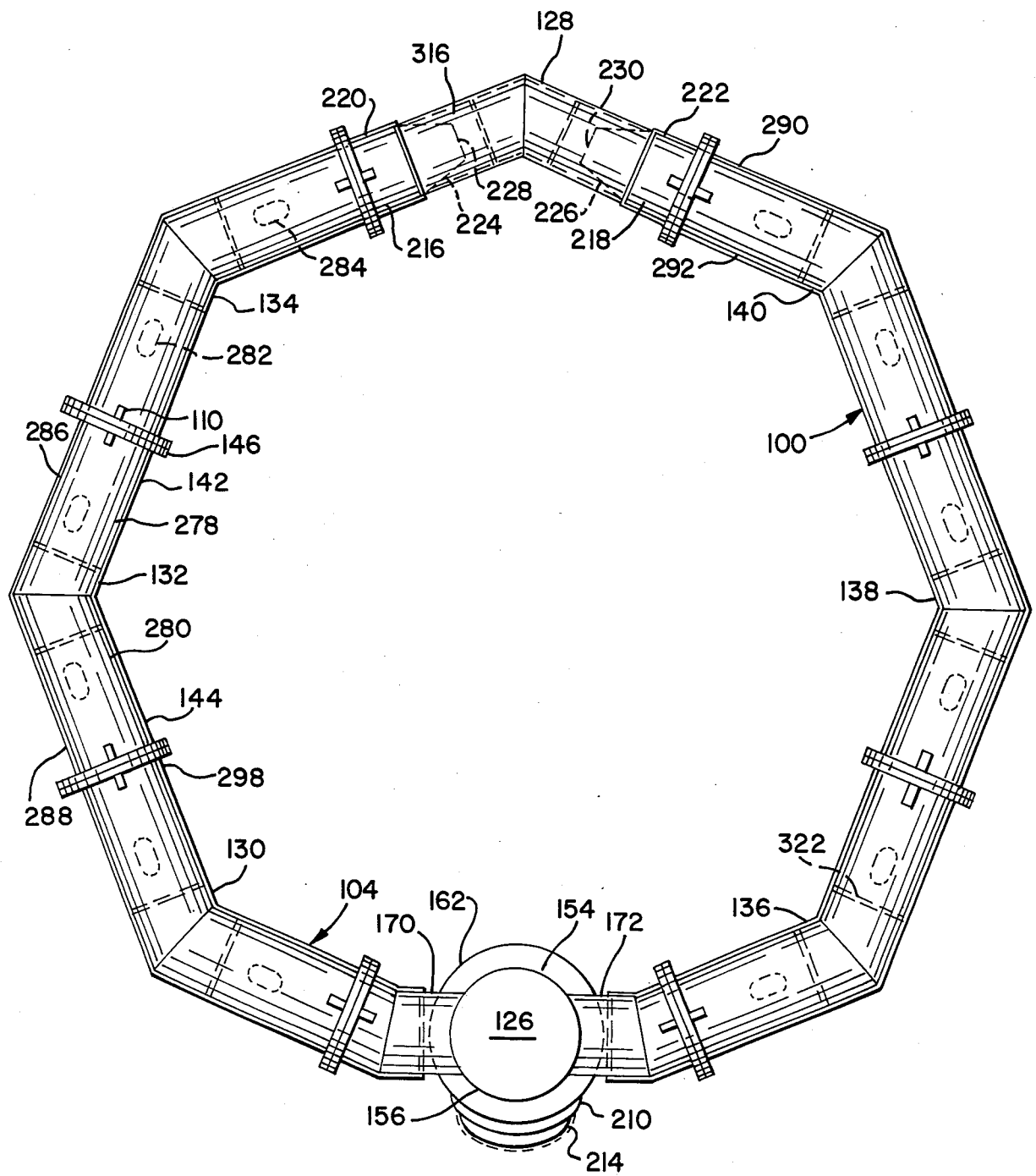

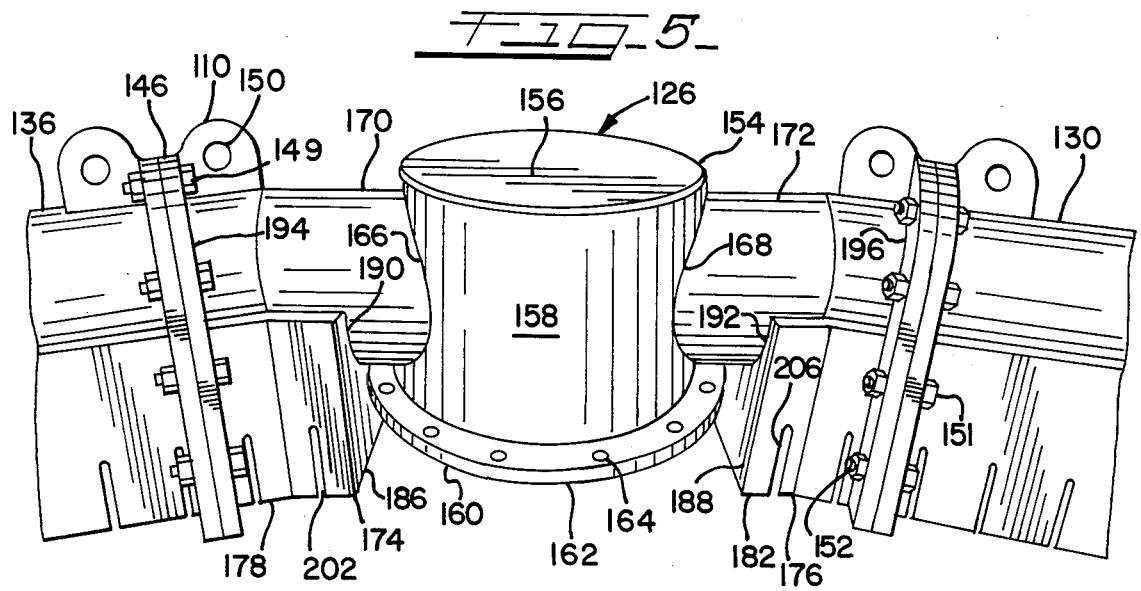
FIG_5_
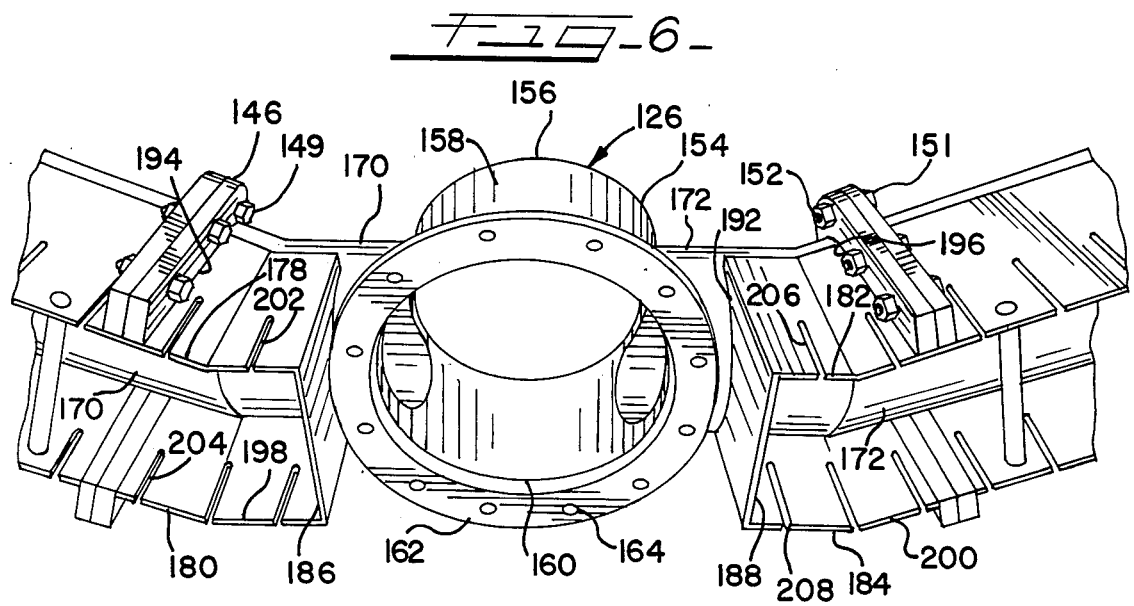
FIG_6_

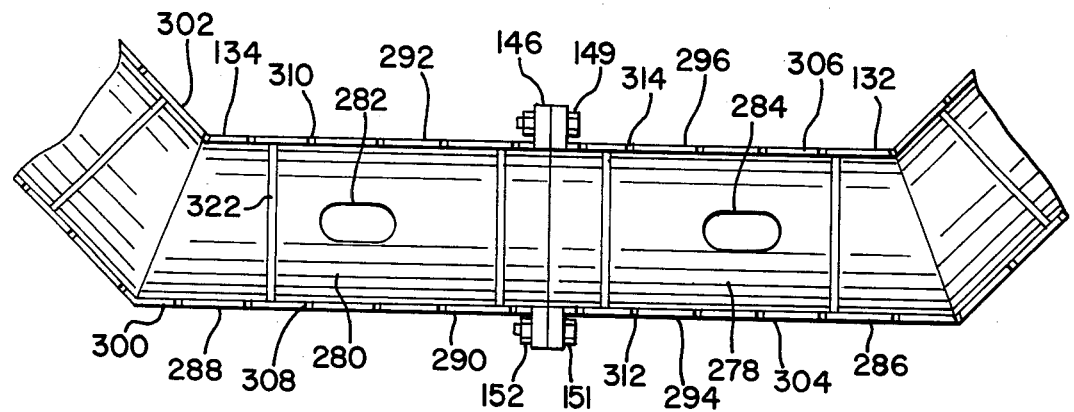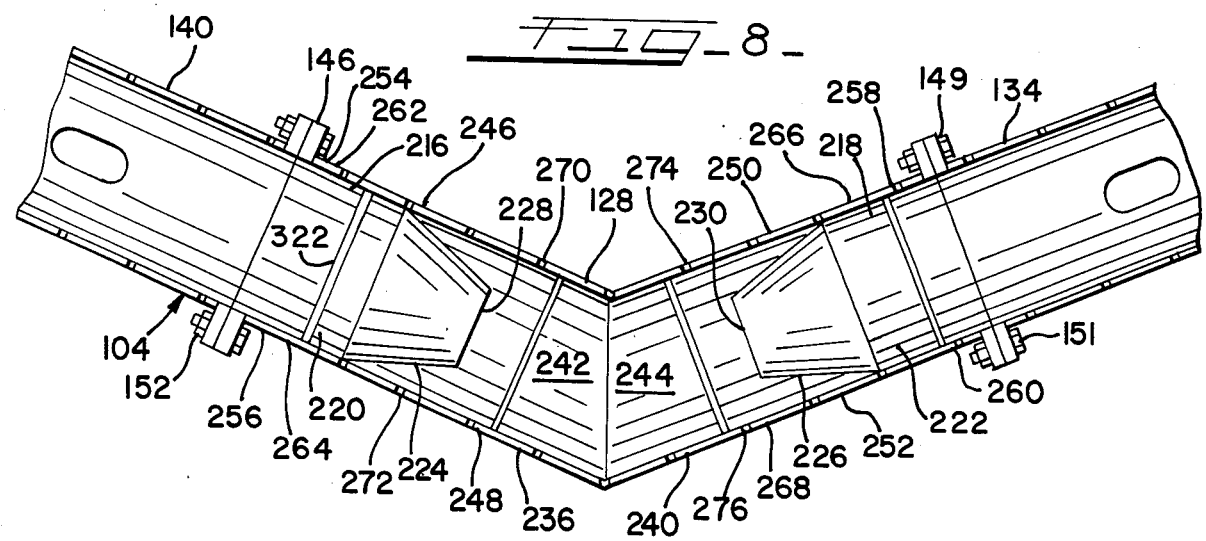

PROCESS FOR RESID HYDROTREATING EMPLOYING FEED DISTRIBUTOR

BACKGROUND OF THE INVENTION

This invention relates to resid hydrotreating and, more particularly, to a feed distributor and process for feeding oil and gas to a reactor.

In the past, spiraling oil costs, extensive price fluctuations, and artificial output limitations by the cartel of oil producing countries (OPEC) have created instability and uncertainty for net oil consuming countries, such as the United States, to attain adequate supplies of high-quality, low-sulfur, petroleum crude oil (sweet crude) from Saudi Arabia, Nigeria, Norway, and other countries at reasonable prices for conversion into gasoline, fuel oil, and petrochemical feedstocks. In an effort to stabilize the supply and availability of crude oil at reasonable prices, Amoco Oil Company has developed, constructed, and commercialized extensive, multimillion dollar refinery projects under the Second Crude Replacement Program (CRP II) to process poorer quality, high-sulfur, petroleum crude oil (sour crude) and demetalate, desulfurize, and hydrocrack resid to produce high-value products, such as gasoline, distillates, catalytic cracker feed, metallurgical coke, and petrochemical feedstocks. The Crude Replacement Program is of great benefit to the oil-consuming nations by providing for the availability of adequate supplies of gasoline and other petroleum products at reasonable prices while protecting the downstream operations of refining companies.

During resid hydrotreating, resid oil (resid) is upgraded with hydrogen and a hydrotreating catalyst in a three-phase mixture of oil, catalyst, and gas bubbles to produce more valuable lower-boiling liquid products. In conventional, prior art resid hydrotreating units, resid oil (resid) and hydrogen are fed and distributed in the reactor along one side of the reactor or from opposite sides of the reactor and are not adequately mixed. This causes an imbalance of liquids (oil) and gases and poor distribution of oil in the grid comprising the bubble tray and bubble caps. Poorly mixed feeds decrease the effectiveness of hydrotreating and diminish the conversion of resid to more valuable lower-boiling liquid products.

Poorly mixed feeds of resid and hydrogen-rich gases can cause hot spots, stagnant zones, excess gas channeling, and loss of product quality. It will also cause the oil (resid) to advance (rise) further up one side of the reactor than the other and increase the maldistribution of the oil and gas feeds.

Nonuniform mixtures of resid and hydrogen-rich gases can accelerate coke formation, increase solids buildup, and plug up the grid. It can lead to premature shutdown, extended downtime, and increased frequency of maintenance and repair. Increased maintenance and repair requires additional manpower and is time consuming, tedious, and expensive. It also decreases the reactor's efficiency and adversely affects the profitability of the unit.

While various aeration diffusers have been used in sewage treatment plants, such as those shown in U.S. Pat. Nos. 3,220,706; 3,424,443; 3,608,834; and 3,954,922; such diffusers have not been used in reactors in oil refineries nor do they appear capable of mixing and distributing gases and oils, such as resid.

It is, therefore, desirable to provide an improved feed distributor and process which overcome most, if not all, of the preceding problems.

SUMMARY OF THE INVENTION

An improved feed distributor and process are provided to uniformly blend, mix, and distribute oil and gas feeds in a reactor of a hydroprocessing plant, such as an ebullated (expanded) bed reactor in an oil refinery or in a petrochemical plant. Advantageously, the novel feed distributor and process are efficient, effective, and economical.

The novel feed distributor and process improve conversion of resid and other types of oil, increase product quality, and enhance profitability of hydrotreating. Desirably, the novel feed distributor and process decrease the frequency of repair, reduce downtime, and enhance the useful life of refining equipment. The novel feed distributor and process minimize coke deposition and improve the flow patterns and oil and gas distribution in the hydrotreating reactors.

To this end, the feed distributor assembly has an annular conduit, tube, or manifold with an inlet and at least one outlet to feed the oil and hydrogen gases in a generally uniform flow pattern in the reactor. A hanger assembly or other connectors are provided to secure the feed distributor to the underside of the grid comprising the bubble tray and bubble caps.

In the preferred form, the feed distributor comprises an octagonal manifold with tapered outlet pipes providing tangential outlet openings, intermediate pipe sections providing a circumferential set of downwardly facing outlets, and a hood comprising a concentric set of vertical slotted skirts with radial discharge openings.

In order to use the feed distributor, an oil feed, preferably comprising resid, and a gas feed, preferably comprising hydrogen-rich gases, are intermixed and dispersed in a common feed line and fed to an annular manifold comprising the feed distributor. In the annular manifold, the oil and gas feeds are mixed to provide a substantially homogeneous mixture of oil and gases. The homogeneous mixture of oil and gases are discharged: (1) downwardly through the circumferential set of downwardly facing outlets in the intermediate pipe sections, (2) tangentially from the tangential outlet openings of the tapered outlet pipes, (3) radially inwardly from the inner slotted skirt of the hood, and (4) radially outwardly from the outer slotted skirt of the hood.

Desirably, the oil and gas feed is discharged in a uniform flow pattern to increase hydrotreating efficiency, effectiveness of the reactor, and resid conversion.

A more detailed explanation of the invention is provided in the following description and appended claims taken in conjunction with the accompanying drawings.

BRIEF DESCRIPTION OF THE DRAWINGS

FIG. 3 is an enlarged perspective view of the feed distributor;

FIG. 4 is a top plan view of the feed distributor;

FIG. 5 is a fragmentary perspective front view of the inlet section of the feed distributor;

FIG. 6 is a fragmentary perspective bottom view of the inlet section of the feed distributor;

FIG. 7 is a fragmentary bottom view of intermediate sections of the feed distributor; and FIG. 8 is a fragmentary bottom view of the outlet section of the feed distributor.

DETAILED DESCRIPTION OF THE PREFERRED EMBODIMENT

Figure 2:
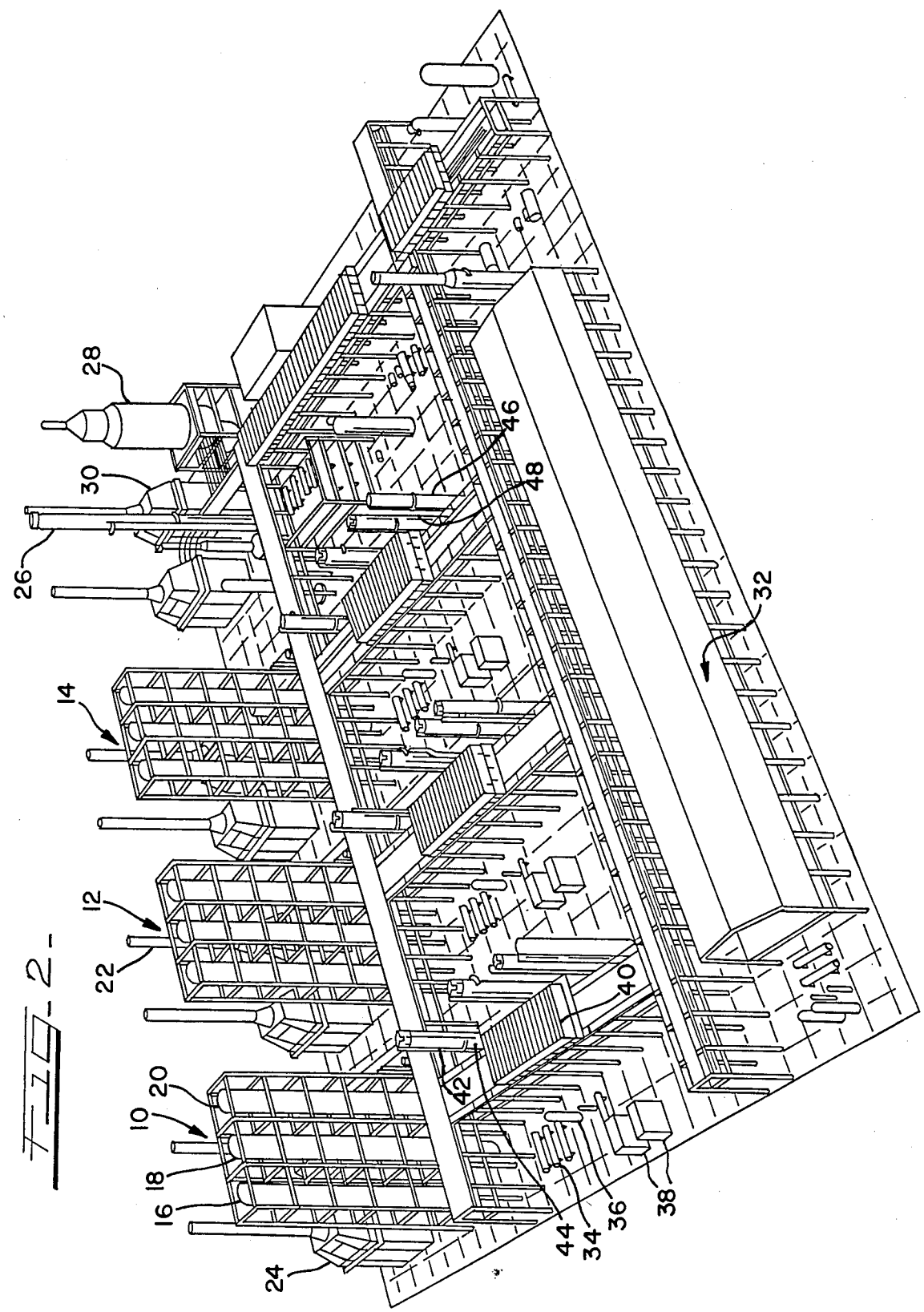
FIG. 2 is a perspective view of resid hydrotreating units and associated refinery equipment.

Referring to FIG. 2, high-sulfur resid oil feed, also referred to as sour crude or vacuum-reduced crude, comprising 1,000+° F. resid and heavy gas oil, is fed into resid hydrotreating units 10, 12, and 14 along with a hydrogen-rich feed gas. Each resid hydrotreating unit is a reactor train comprising a cascaded series or set of three ebullated (expanded) bed reactors 16, 18, and 20. In the reactors, the resid is hydroprocessed (hydrotreated) in the presence of fresh and/or equilibrium hydrotreating catalyst and hydrogen to produce an upgraded effluent product stream leaving used spent catalyst. Hydroprocessing in the RHU includes demetalation, desulfurization, denitrogenation, resid conversion, oxygen removal (deoxygenation), and removal of Rams carbon.

As shown in FIG. 2, the resid hydrotreating units and associated refining equipment comprise three identical parallel trains of cascaded ebullated bed reactors 16, 18, and 20, as well as hydrogen heaters 22, influent oil heaters 24, an atmospheric tower 26, a vacuum tower 28, a vacuum tower oil heater 30, a hydrogen compression area 32, oil preheater exchangers 34, separators 36, recycled gas compressors 38, air coolers 40, raw oil surge drums 42, sponge oil flash drums 44, amine absorbers and recycled gas suction drums 46, and sponge oil absorbers and separators 48.

Each of the reactor trains comprises three ebullated bed reactors in series. The oil feed comprises resid oil (resid) and heavy gas oil. The gas feed comprises upgraded recycled gases and fresh makeup gases. Demetalation primarily occurs in the first ebullated bed reactor in each train. Desulfurization occurs throughout the ebullated bed reactors in each train. The effluent product stream typically comprises light hydrocarbon gases, hydrotreated naphtha, distillates, light and heavy gas oil, and unconverted hydrotreated resid. The hydrotreating catalyst typically comprises a hydrogenating component on a porous refractory, inorganic oxide support.

The resid hydrotreating unit is quite flexible and, if desired, the same catalyst can be fed to one or more of the reactors or a separate demetalation catalyst can be fed to the first reactor while a different catalyst can be fed to the second and/or third reactors. Alternatively, different catalysts can be fed to each of the reactors. The spent catalyst typically contains nickel, sulfur, vanadium, and carbon (coke). Many tons of catalyst are transported into, out of, and replaced in the ebullated bed reactors daily.

Figure 1:
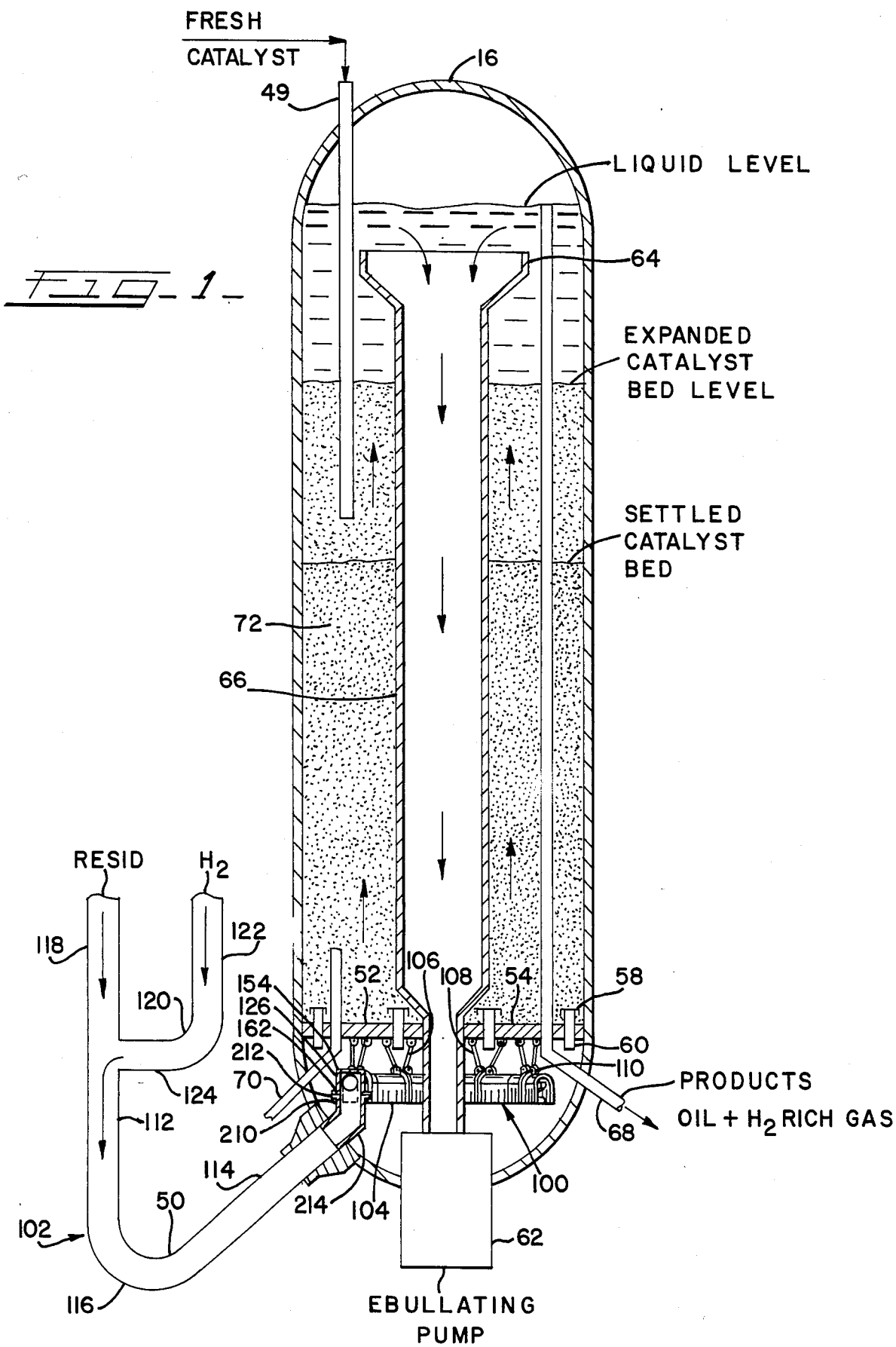
FIG. 1 is a cross-sectional view of an ebullated bed reactor containing a feed distributor assembly in accordance with principles of the present invention.

As shown in FIG. 1, fresh hydrotreating catalyst can be fed downwardly into the top of the first ebullated bed reactor 16 through a fresh catalyst feed line 49. Hot resid feed and hydrogen-containing feed gases enter the bottom of the first ebullated bed reactor 16 through a common feed line 50 and flow upwardly into an annular feed distributor 100. The feed distributor 100 comprises an octagonal manifold, torus, and header 104 which provide a plenum chamber positioned within the interior of the bottom portion of the ebullated bed reactor 16 to mix and blend the oil and gas feed in a homogeneous manner and to radially and annularly distribute the oil and gas feeds in a uniform flow pattern in the bottom portion of the reactor 16.

The uniform, homogeneous mixture of oil and gases flows upwardly through a grid 52 comprising a bubble tray or distributor plate 54 containing numerous bubble caps 58 and risers 60 which help further distribute the oil and gas across the reactor 16 and prevent catalyst from falling into the bottom section of the reactor. An ebullating pump 62 circulates oil from a recycle pan 64 through a downcomer 66 and the grid 52. The rate is sufficient to lift and expand the catalyst bed from its initial settled level to its steady state expanded level. The effluent product stream of partially hydrotreated oil and hydrogen-rich tail gases (off gases) is withdrawn from the reactor 16 through an effluent product line 68. The used spent catalyst is withdrawn from the bottom of the reactor through a spent catalyst discharge line 70. The spent catalyst typically contains deposits of metals, such as nickel and vanadium, which have been removed from the influent feed oil (resid) during hydrotreating.

Catalyst particles are suspended in a three-phase mixture of catalyst, oil, and hydrogen-rich feed gases in the reaction zone 72 of the reactor. Hydrogen-rich feed gases typically continually bubble through the oil. The random ebullating motion of the catalyst particles results in a turbulent mixture of the phases which promotes good contact mixing and minimizes temperature gradients.

The cascading of the ebullated bed reactors 16, 18, and 20 in a series of three per reactor train, in which the effluent of one reactor serves as the feed to the next reactor, greatly improves the catalytic performance of the back mixed ebullated bed process. Increasing the catalyst replacement rate increases the average catalyst activity.

As shown in FIG. 1, the feed distributor assembly 100 includes a bifurcated, generally Y-shaped feed header 102, a substantially octagonal, annular manifold comprising a feed distributor 104, and a hanger assembly 106. The hanger assembly 106 comprises a set of downwardly converging rods or bars 108 which extend between and connect the hanger flanges 110 or other portions of the feed distributor 104 to the underside of the grid 52 comprising the bubble tray 54. The rods 108 can be bolted, fastened, or otherwise securely connected to the feed distributor 104 and the grid 52. The hanger assembly 106 fixedly carries, cradles, hangs, supports, and positions the annular octagonal manifold (feed distributor) 104 about the downcomer 66 of the ebullated bed reactor 16.

As shown in FIG. 1, the feed header 102 has a generally V-shaped, common, combined inlet feed line 50. Common feed line 50 has an inlet end 112 to receive, combine, disperse, and mix an oil feed comprising resid and gas oil and a gas feed comprising hydrogen-rich gases. The common feed line 50 also has an outlet end 114 which is connected to and communicates with the bottom portion of the ebullated bed reactor 16 to feed the combined oil and gas feeds into the reactor. A curved vertex 116 connects the inlet end 112 and outlet end 114 of the common feed line 50.

An oil feed line 118 (FIG. 1) is positioned in alignment with, is connected to, and communicates with the inlet end 112 of the common feed line 50 to feed the oil feed into the common feed line 50. A gas feed line 120 has an elongated inlet portion 122 positioned parallel to the oil feed line 118 and has an outlet portion 124 positioned perpendicular to and offset from both the oil feed line 118 and the inlet end 112 of the common feed line 50. The outlet portion 124 of the gas feed line 120 is connected to and communicates with the inlet end 112 of the common feed line 50 to feed the hydrogen-rich gases into the common feed line. The gas feed line 120 has a substantially larger diameter than the oil feed line 118 in order to accommodate the desired material balance and flow rates.

As shown in FIG. 1, the octagonal manifold and feed distributor 104 provides a plenum chamber which is positioned within the interior of the bottom portion of the ebullated bed reactor 16. The manifold 104 is positioned above the ebullating pump 62 and below the grid 52 comprising the bubble tray 54, bubble caps 58, and risers 60. The octagonal manifold 104 annularly surrounds the downcomer 66 about the vertical axis of the ebullated bed reactor 16. The manifold provides an effective feed distributor for blending, mixing, and obtaining a homogeneous mixture of the feed oil and the hydrogen-rich feed gases. Desirably, the feed distributor 104 radially, annularly, circumferentially, tangentially, and vertically distributes the oil and gas feed in the bottom portion of the reactor 16 in a substantially uniform flow pattern.

As shown in FIGS. 3 and 4, the octagonal manifold and feed distributor 104 has eight manifold sections with opposite ends including an inlet manifold section 126, an outlet manifold section 128, and six intermediate manifold sections 130, 132, 134, 136, 138, and 140. The opposite end portions 142 and 144 of each of the manifold sections 126-140 have an inverted U-shaped mounting flange 146 with bolt holes 148 to abuttingly engage a similar U-shaped mounting flange of an adjacent manifold section. Each of the opposite end portions 142 and 144 of the manifold sections 126-140 can also have an upwardly extending hanger flange 110 with a bolt hole or rod receiving opening 150. Fasteners 149 (FIG. 5), such as bolts 151 and nuts 152, securely connect and mount the engaged U-shaped flanges 146 together. As shown in FIG. 4, the outlet section 128 and the intermediate sections 130-140 are V-shaped with an included obtuse angle of about 140° as viewed from the top of the octagonal manifold 104.

As best shown in FIGS. 5 and 6, the inlet section 126 of the octagonal manifold and the feed distributor 104 has an enlarged inlet head 154 with a planar or flat circular disk 156 providing a top and an annular, circular sidewall 158 extending vertically downwardly from the disk 156 to provide an inlet opening and mouth 160. A lower annular circular flange 162 with bolt holes 164 annularly and circumferentially surrounds the inlet opening 160 and is connected to and diametrically extends outwardly of the bottom portion of the annular sidewall 158. The annular sidewall 158 has diametrically opposite inlet ports 166 and 168.

The inlet manifold section 126 (FIGS. 5 and 6) has substantially diametrically opposite, inlet pipe sections 170 and 172 which communicate with the inlet ports 166 and 168 and are connected to and extend radially outwardly from the annular sidewall 158 of the inlet head 154. The inlet manifold section 126 also has diametrically opposite inlet skirt portions 174 and 176 which are welded or otherwise securely connected to and cantilevered from the diametrically opposite inlet pipe sections 170 and 172, respectively. Each of the inlet skirt portions 174 and 176 has a pair of parallel vertical inlet flanges 178 and 180 or 182 and 184 which are welded or otherwise tangentially connected to and extend vertically downwardly from the inlet pipe sections 170 and 172. Each of the inlet skirt portions 174 and 176 also has a transverse flange 186 or 188 which extends transversely and perpendicularly between and is welded or otherwise connected to the inlet skirt flanges 178 and 180 or 182 and 184. The transverse skirt flanges 186 and 188 have a rounded concave upper end portion 190 and 192 which are welded or otherwise arcuately connected to and extend vertically downwardly from the inlet pipe sections 170 and 172 at a location spaced radially outwardly of the annular sidewall 158 of the inlet head 154. Each of the inlet skirt flanges 178–184 has an outer end 194 or 196 which is welded or otherwise connected to one of the U-shaped mounting flanges 146. Each of the skirt flanges 178–184 also has a lower inlet portion 198 or 200 with an inlet set of elongated, vertical inlet discharge slots 202, 204, 206, or 208.

As shown in FIG. 1, the inlet manifold section 126 has a downwardly extending elbow pipe or tube 210 with an upper, circular, annular flange 212 which is mounted against and connected to the lower annular flange 162 of the inlet head 154. The elbow pipe 210 has a lower inlet portion 214 which is snugly connected to and communicates with the outlet end portion 114 of the common feed line 50.

The outlet manifold section 128 (FIG. 4) is positioned diametrically opposite the inlet manifold section 126. As best shown in FIG. 8, the outlet section 128 of the octagonal manifold and feed distributor 104 has a pair of outlet pipe sections 216 and 218. Each of the outlet pipe sections 216 and 218 has an enlarged influent portion 220 or 222, which has the same diameter as the other pipe sections, and has a tapered outlet portion 224 or 226 which provides a constricted outlet opening and mouth 228 and 230. The outlet openings 228 and 230 have a much smaller diameter than the influent portions 220 and 222 of the outlet pipe sections 216 and 218. The outlet openings 228 and 230 generally face and are spaced apart from each other. The outlet openings 228 and 230 tangentially discharge some of the oil and gas feed. The outlet pipe sections 216 and 218 are positioned at an angle of inclination of about 45° from each other and are spaced apart from each other. In one test unit, the area of the eccentric reducers (tapered outlet pipe sections) was about 18 percent of the inlet nozzle area (enlarged influent portions).

The outlet manifold section 128 (FIGS. 3 and 8) has an inverted U-shaped skirt 236 comprising a pair of vertical outlet skirt portions 236 and 240. The outlet skirt portions are welded or otherwise securely connected to and intersect each other at an angle of inclination of about 45°. Each of the outlet skirt portions has an inverted U-shaped, upper bight 242 or 244 which provides a top portion that is positioned above and protectively covers the outlet pipe sections 216 and 218. Each of the outlet skirt portions has a pair of parallel, vertical outlet skirt flanges 246 and 248 or 250 and 252 which are welded or otherwise securely connected to and cantilevered downwardly from the U-shaped bight. Each of the outlet skirt flanges has an outer end 254, 256, 258 or 260 (FIG. 4) which is welded or otherwise securely connected to one of the U-shaped mounting flanges 146. Each of the outlet skirt flanges also has a lower outlet portion 262, 264, 266, or 268 which provides an outlet set of elongated, vertical discharge outlet slots 270, 272, 274, and 276.

Each of the intermediate manifold sections 130-140 (FIGS. 3, 4, and 7) has a pair of intermediate pipe sections 278 and 280. The intermediate pipe sections 278 and 280 are connected to and communicate with each other and with an adjacent pipe section. The intermediate pipe sections 278 and 280 are positioned at an angle of inclination of about 45° to each other and to an adjacent pipe section. Each of the intermediate pipe sections 278 and 280 has a downwardly facing, elongated, oblong opening or slot 282 or 284 which provides discharge outlets to discharge most of the oil and gas feeds downwardly. In one test unit, the total area of the downwardly facing slots in the pipe sections was about 59 percent of the inlet nozzle area so that the velocities were sufficient for substantially equal distribution around the feed distributor.

Each of the intermediate manifold sections 130-140 (FIGS. 3, 4, and 7) also has a pair of intermediate skirt portions 286 and 288. The skirt portions 286 and 288 are welded or otherwise connected to each other. The intermediate skirt portions 286 and 288 are connected to adjacent skirt portions via the U-shaped mounting flanges 146. The intermediate skirt portions 286 and 288 are also positioned at an angle of inclination of about 45° to each other and to an adjacent skirt portion. Each intermediate skirt portion 286 and 288 includes a pair of parallel, vertical, intermediate skirt flanges 290 and 292 or 294 and 296. The intermediate skirt flanges are welded or otherwise tangentially connected to and extend and are cantilevered downwardly from the intermediate pipe sections 278 and 280. Each of the intermediate skirt flanges has an outer end 298 welded or otherwise connected to one of the U-shaped mounting flanges 146. Each of the intermediate skirt flanges also has a lower portion 300, 302, 304, or 306 with an intermediate set of elongated, vertical, intermediate discharge slots 308, 310, 312, or 314.

The skirt portions of the inlet, outlet, and intermediate sections 126-130 of the octagonal manifold and feed distributor 104 cooperate with each other and the pipe sections of the octagonal manifold and feed distributor 104 to provide an octagonal skirt and hood 316 (FIG. 3). The octagonal skirt and hood 316 extends eccentrically about the inlet head 154. In one test unit, the hood extended circumferentially about 335° around the inside of the ebullated bed reactor at about two-thirds of the reactor's internal diameter so that the area radially inwardly of the feed distributor was about equal to the area radially outwardly of the feed distributor.

The vertical, upright discharge slots of the skirt portions of the octagonal skirt and hood 316 (FIG. 3) cooperate with each other to provide concentric inner and outer octagonal sets 318 and 320 of radial slots. The slots provide for overflow, spillage, and radial discharge of the oil and gas feeds. The inner set of inner radial slots 320 discharges some of the oil and gas feeds radially inwardly. The outer set of outer radial slots 318 discharges some of the oil and gas feeds radially outwardly.

As shown in FIGS. 6-8, a set of transverse reinforcing bars or rods 322 is welded or otherwise securely connected to, extends radially between, and is positioned perpendicular to the skirt portions of the outlet manifold section 128 and the intermediate manifold sections 130-140. The reinforcing bars 322 are spaced below the outlet pipe sections and the intermediate pipe sections, respectively. The reinforcing rods help reinforce and rigidify the octagonal skirt and hood.

In operation, an oil feed comprising resid and gas oil is fed downwardly through the oil feed line 118 (FIG. 1) into the inlet end 112 of the common feed line 50. Simultaneously, a gas feed comprising hydrogen-rich gases is injected downwardly through the gas feed line 120 into the inlet end 112 of the common feed line 50. The oil and gas feeds are dispersed and mixed in the common feed line 50 and are passed upwardly through the outlet end 114 into the inlet manifold section 126 of the octagonal manifold and feed distributor 104.

In the octagonal manifold and feed distributor 104 (FIG. 4), the oil and gas feeds are separated into two streams: (1) a clockwise stream of oil and gas which passes through the left inlet pipe section 170, the left intermediate pipe sections 130-134, and the left outer pipe section 216; and (2) a counter-clockwise stream of oil and gas which passes through rhe right inlet pipe section 172, the right intermediate pipe sections 136-140, and the right outer pipe section 218. The clockwise and counter-clockwise streams provide an arcuate, annular, or octagonal flow distribution whicn mixes and blends the oil and gas feeds into a substantially homogeneous mixture for more effective hydrotreating. The oil and gas feeds are discharged downwardly through the downwardly facing discharge openings 282 and 284 and tangentially clockwise and counter-clockwise through the tangential outlet openings 228 and 230. The tangential outlet openings provide an auxiliary outlet in the event of coking or plugging of the downwardly facing discharge openings. The tangential openings also enhance self-cleaning of the distributor to minimize coking or plugging of the downwardly facing discharge openings. The oil and gas feed spills outwardly from the bottom open end of the octagonal skirt and hood 316 and flows radially inwardly and outwardly through the inner and outer slots of the octagonal skirt and hood 316. The oil and gas feed is distributed and discharged in a substantially uniform flow pattern.

The oil and gas feeds which have been discharged from the octagonal manifold and feed distributor 104 (FIG. 1) are passed upwardly through the risers 60 and bubble caps 58 before entering the reaction zone of the reactor 16. Fresh hydrotreating catalyst can be fed downwardly through the catalyst feed line into the reaction zone of the reactor 16.

In the reaction zone of the reactor 16 (FIG. 1), the oil and gas feeds are ebullated and hydroprocessed in the presence of the fresh hydrotreating catalyst to produce an effluent product stream of upgraded hydrotreated oil and reactor tail gases (off gases) which is withdrawn from the ebullated bed reactor 16 through an effluent product line. The used spent catalyst is withdrawn from the bottom of the ebullated bed reactor 16 through the spent catalyst discharge line.

The novel feed distributor assembly and process has been extensively tested at the Amoco Oil Company Refinery in Texas City, Tex. and has been found to produce unexpected, surprisingly good results.

Among the many advantages of the novel feed distributor assembly and process are:
1. Superior mixing, blending, dispersion, and distribution of oil and gas feeds.
2. Increased conversion of resid to more valuable products.
3. Excellent process efficiency.

4. Improved process effectiveness.
5. Establishes a more stable, uniform gas-liquid interface level under the grid.
6. Better product quality.
7. Enhanced operability.
8. Lower operating and maintenance costs.
9. Reduced downtime.
10. Ability to distribute a three-phase feed.
11. Capability of handling solid-laden fluids.
12. Self-cleaning.
13. Prevent coking above, on, and under the grid.
14. Minimized catalyst agglomeration on the grid.
15. Can be retrofitted to existing reactors.
16. Readily removeable for maintenance.

Although embodiments of this invention have been shown and described, it is to be understood that various modifications and substitutions, as well as rearrangements and combinations of process steps and equipment, can be made by those skilled in the art without departing from the novel spirit and scope of this invention.

What is claimed is:

1. A hydrotreating process for an ebullated bed reactor, comprising the steps of:
   feeding an oil feed comprising resid into a common feed line;
   injecting a gas feed comprising hydrogen-rich gases into said feed line;
   dispersing said gas feed in said oil feed in said feed line;
   passing said gas and oil feeds from said feed line to a single feed distributor comprising an annular manifold in the bottom portion of an ebullated bed reactor;
   annularly distributing and discharging said oil and gas feeds from the same single feed distributor in the bottom portion of said reactor in a generally uniform flow pattern, some of said oil and gas feeds being discharged substantially downwardly from said single feed distributor;
   passing said oil and gas feeds generally upwardly through a set of bubble caps;
   conveying a hydrotreating catalyst to said reactor;
   ebullating and hydroprocessing said oil and gas feeds in the presence of said hydrotreating catalyst in said ebullated bed reactor to produce an upgraded hydrotreated oil; and
   withdrawing said upgraded hydrotreated oil from said reactor.

2. A hydrotreating process in accordance with claim 1 wherein said oil and gas feeds are mixed in a homogeneous manner in said annular manifold.

3. A hydrotreating process in accordance with claim 1 wherein some of said oil and gas feeds are tangentially discharged from tangential outlet openings of the outlet pipe sections of said manifold.

4. A hydrotreating process in accordance with claim 1 wherein some of said oil and gas feeds are discharged radially inwardly from an inner slotted skirt of said manifold and some of said oil and gas feeds are discharged radially outwardly from an outer slotted skirt of said manifold.

5. A hydrotreating process in accordance with claim 4 wherein said feed distributor comprises a substantially octagonal manifold and said oil and gas feeds are directed through said octagonal manifold in a substantially octagonal flow pattern.

* * * * *